United States Patent

Chika

[11] 3,893,703
[45] July 8, 1975

[54] AUTOMATICALLY DEPLOYED OCCUPANT RESTRAINT SYSTEM

[76] Inventor: John J. Chika, 1350 Orchard Ridge Rd., Bloomfield Hills, Mich. 48013

[22] Filed: Aug. 7, 1972

[21] Appl. No.: 278,559

[52] U.S. Cl. .............................. 280/150 B; 180/103
[51] Int. Cl. ............................................. B60r 21/06
[58] Field of Search .... 280/150 B, 150 SB, 150 AB; 180/101, 103, 82 C

[56] References Cited
UNITED STATES PATENTS

| | | | |
|---|---|---|---|
| 2,743,942 | 5/1956 | Walters | 280/150 B |
| 2,749,143 | 6/1956 | Chika | 280/150 B |
| 2,777,531 | 1/1957 | Erickson | 180/103 |
| 2,801,866 | 8/1957 | Naslund | 280/150 B |
| 2,824,293 | 2/1958 | Meinhardt | 280/150 SB |
| 3,449,714 | 6/1969 | Farley, Jr. | 280/150 SB X |
| 3,495,675 | 2/1970 | Hass et al. | 180/103 X |
| 3,702,706 | 11/1972 | Sobkow | 280/150 AB |
| 3,776,359 | 12/1973 | Breitschwerdt | 280/150 B X |
| 3,782,492 | 1/1974 | Hollins | 280/150 B |

FOREIGN PATENTS OR APPLICATIONS

| | | | |
|---|---|---|---|
| 1,171,770 | 11/1969 | United Kingdom | 280/150 B |

*Primary Examiner*—Leo Friaglia
*Assistant Examiner*—David M. Mitchell

[57] ABSTRACT

A multiple duty passenger restraining system of the fully automatic, passive or nondependent type, operating as follows: The system stays retracted out of the way when the seat is not occupied, but if the seat is occupied and the vehicle reaches the preselected speed, a table-like protective panel is automatically positioned above his lap, and a knee shield is positioned ahead and above his knees; the table is adjustable vertically, longitudinally and angularilly by him to suit his own physique, convenience and comfort, so he may use it as a table or a tray while traveling, and will stay extended in the minimum preselected position even against his will, until such time when the vehicle either collides or is stopped and a control means are actuated for its retraction; however, should there be a sudden deceleration or a collision while the table is used, it will instantly, automatically tilt around its transverse axis, triggered by the inertia of the vehicle and of the user's body, so that the table will present its wide, flat, bottom surface against the chest and upper torso of the occupant, and a chin-guard is released from the rear edge of said table, while at the same instant a separate knee-shield is positioned in front of his knees, so that the G load is absorbed thus or by his knees, chest and shoulders, while his head is saved from the forward whiplash, and holding him in a sitting position, this preventing him from being catapulted forward of sideway and keeping him in this protective, moderately jacknifed position as long as the vehicle is in motion.

47 Claims, 35 Drawing Figures

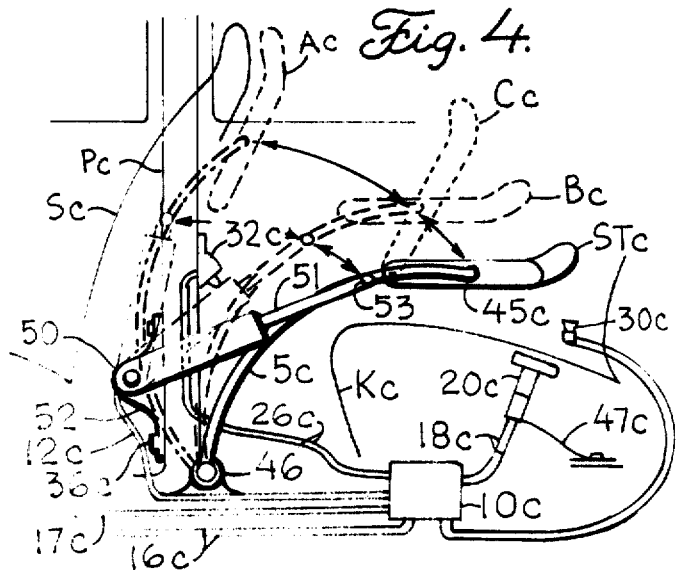
Fig. 4.
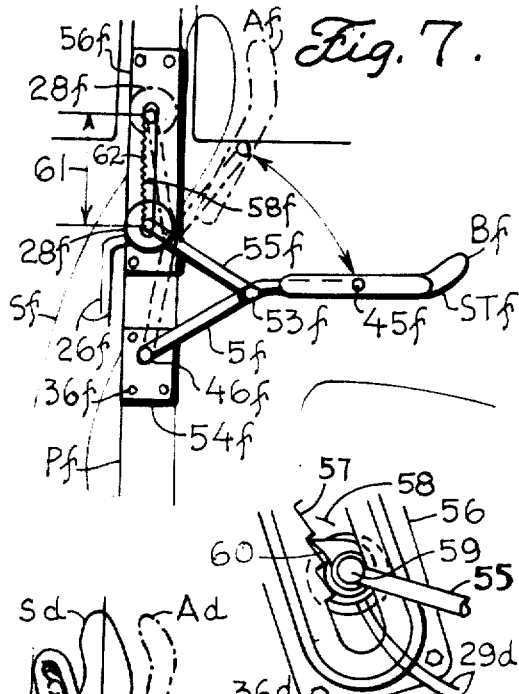
Fig. 7.
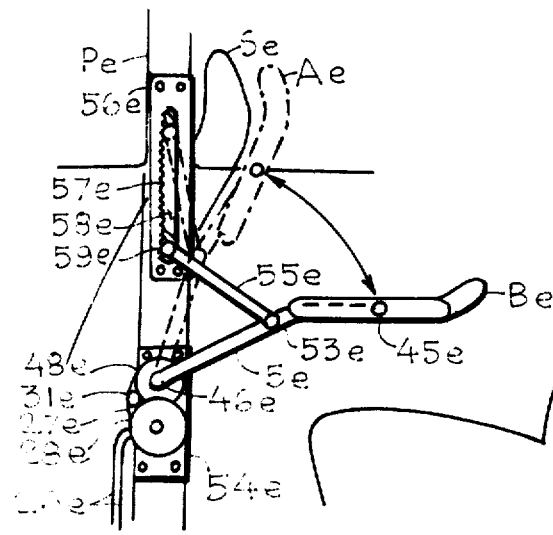
Fig. 6.
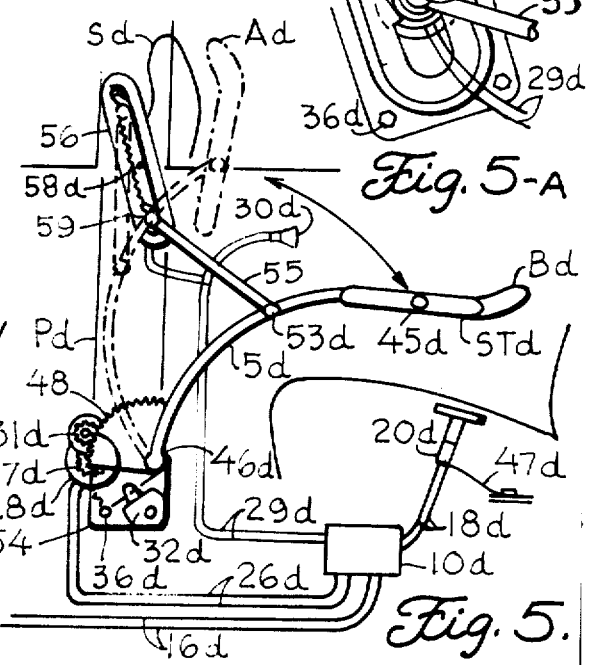
Fig. 5-A
Fig. 5.
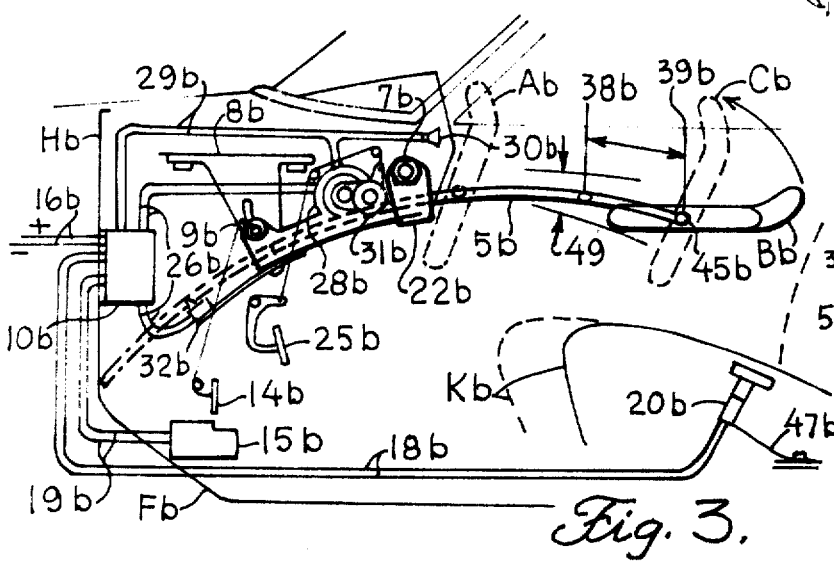
Fig. 3.
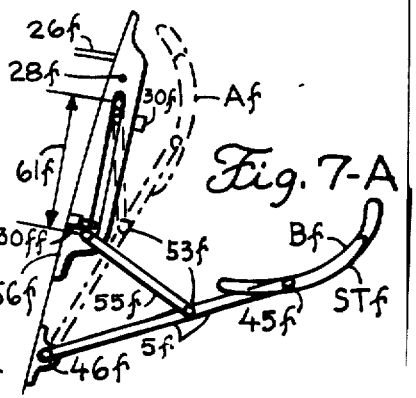
Fig. 7-A

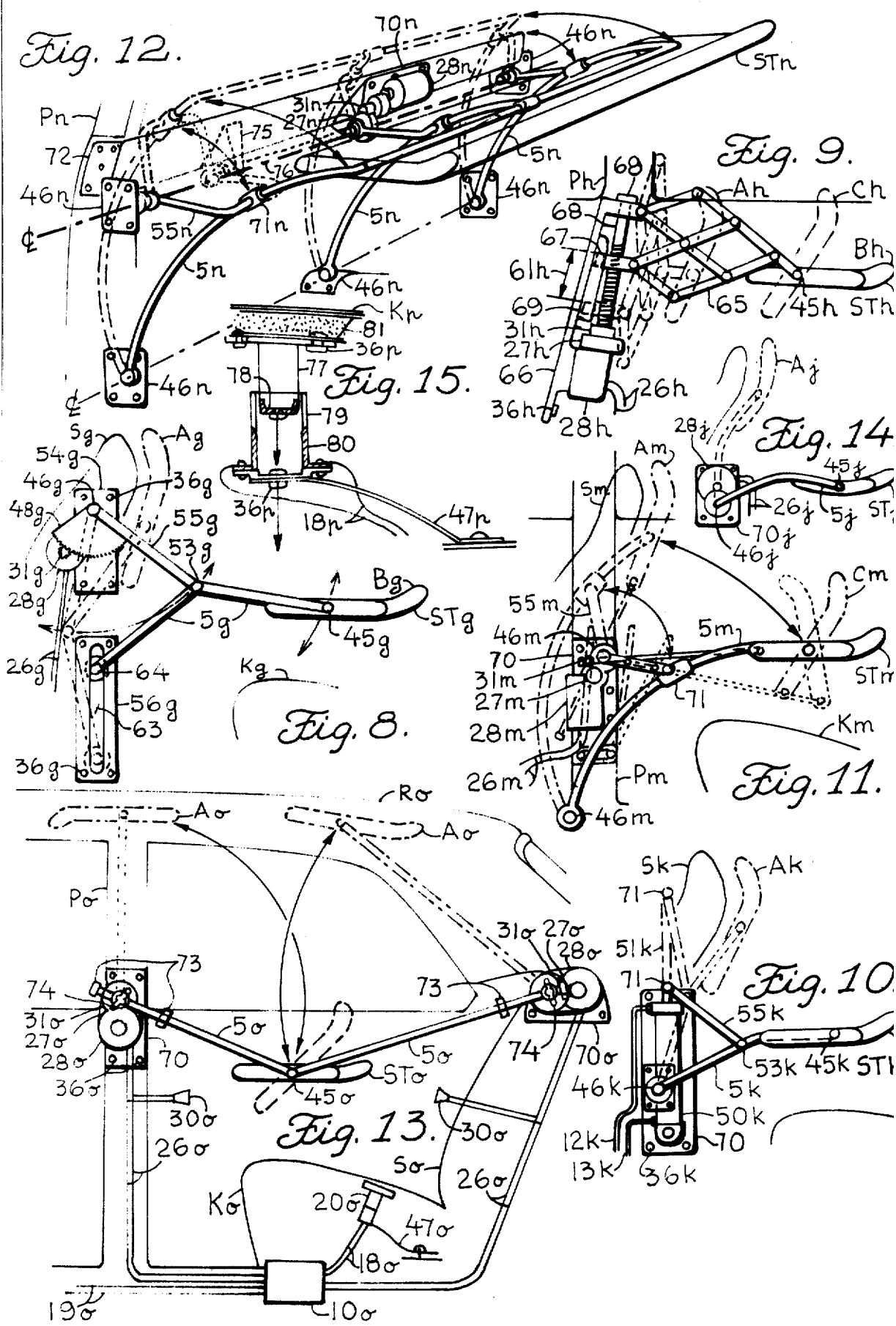

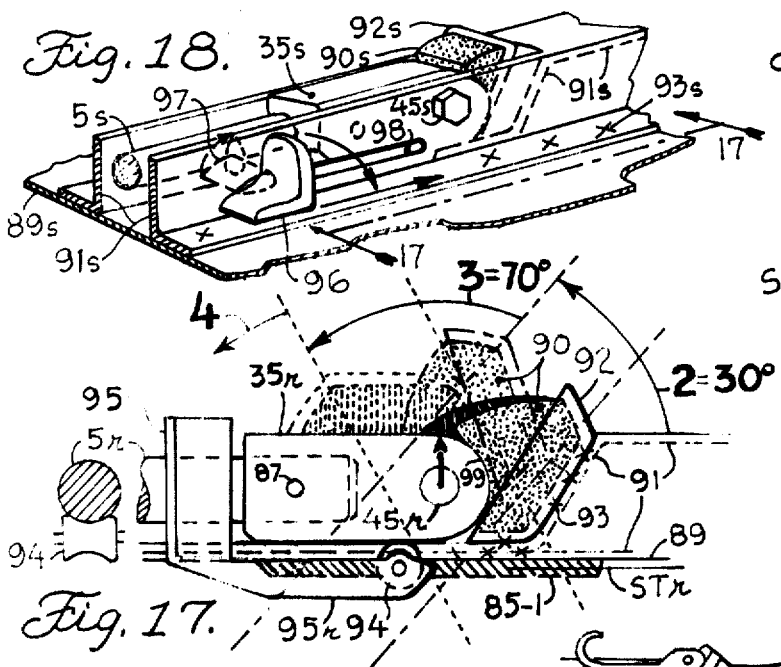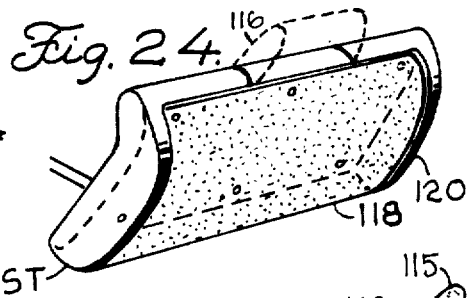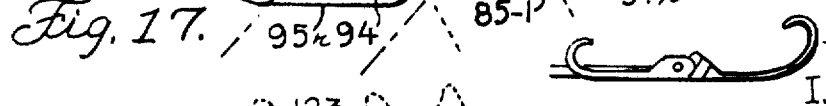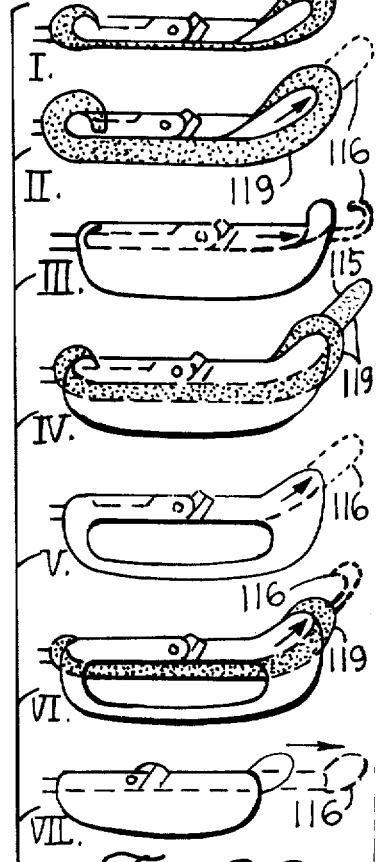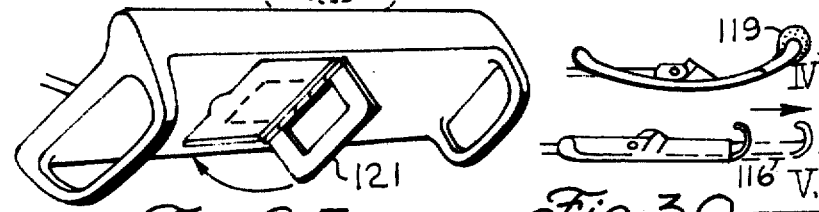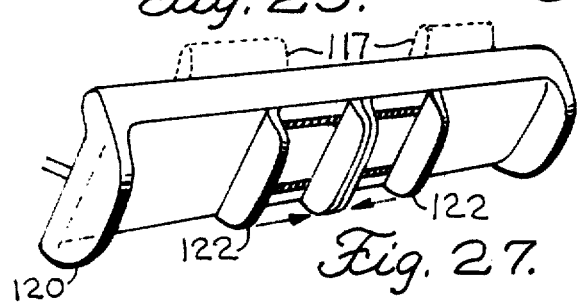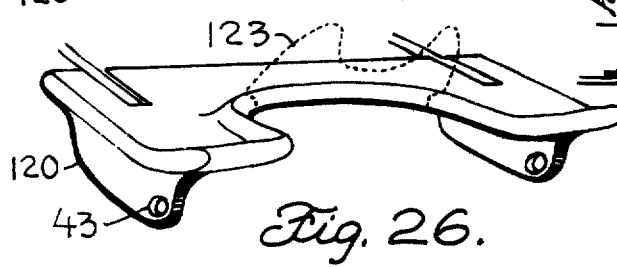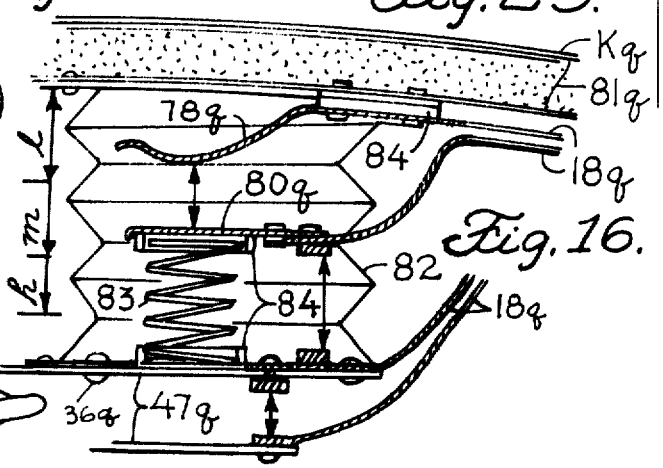

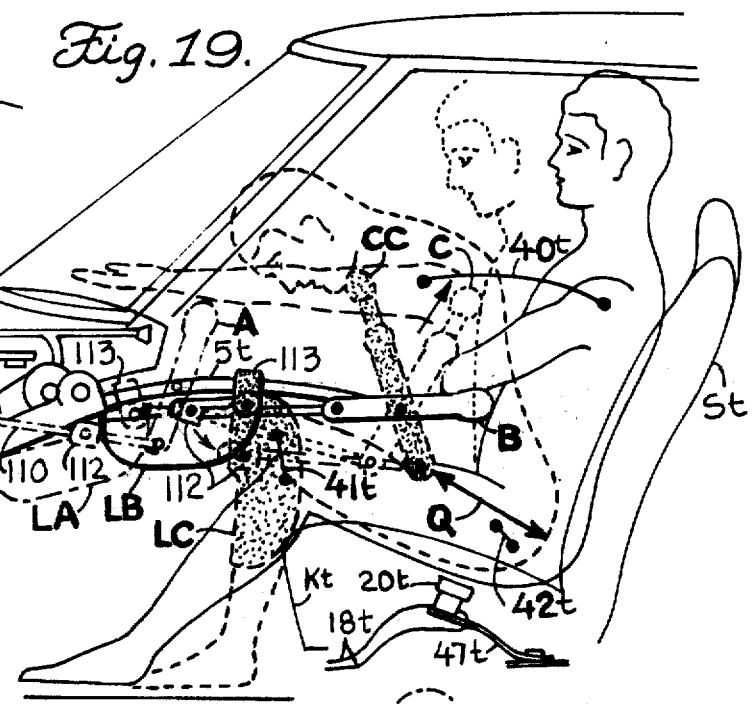
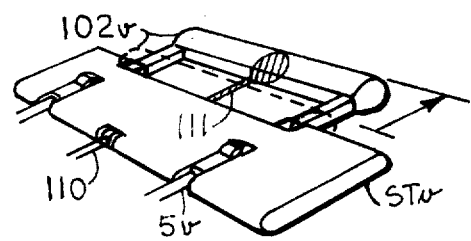
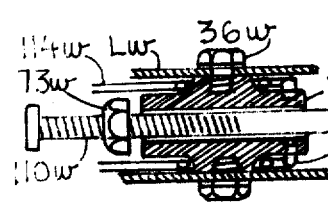
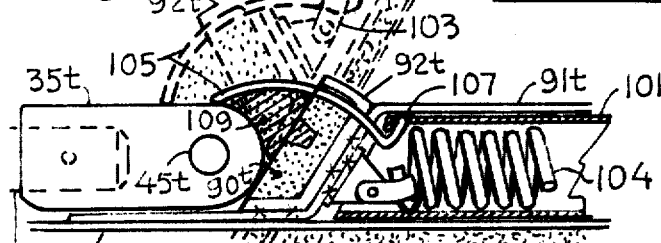
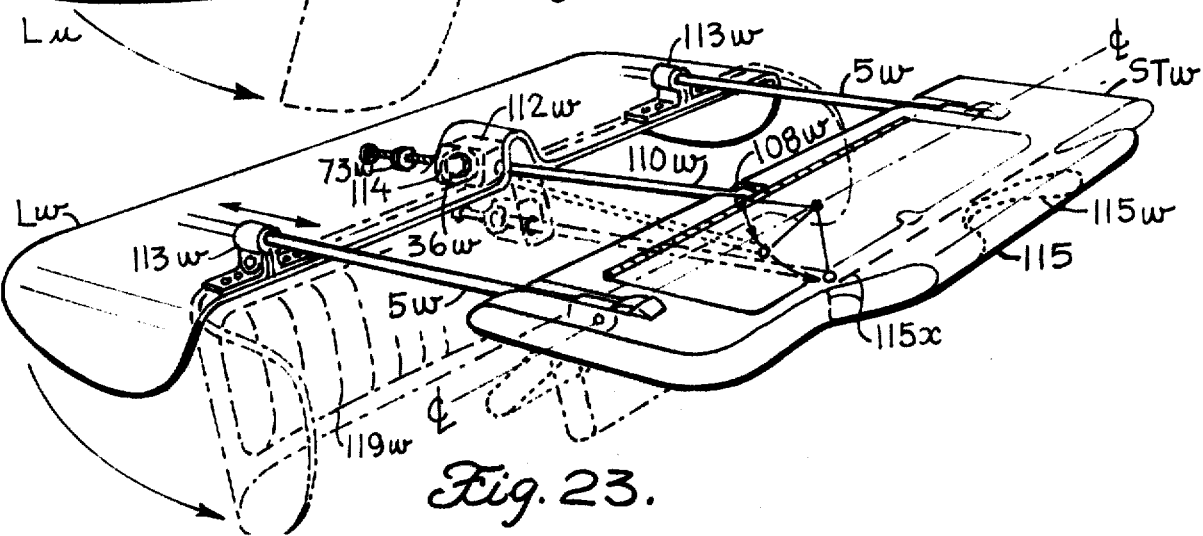

AUTOMATICALLY DEPLOYED OCCUPANT RESTRAINT SYSTEM

BACKGROUND OF THE INVENTION

Bearing in mind that the positive control of the occupant kinematics is the most important single factor in designing any vehicle occupant restraining system, the present invention offers a multiple duty, comfort and safety device system of the fully automatic, sensor actuated type, beneficial to its user at all times while he occupies the vehicle seat; it accommodates the full range of torsoes and its protection is taylored to the need of the user and the speed at the collision impact. While the system is retracted, it blends with the interior while still offering padded surface for absorbtion of minor injuries and acts as an assist bar for entry and exit of passengers without hinderring their movement with bulky "credenzas".

It contains many useful improvements of my "Passenger Safety Device for Vehicles," U.S. Pat. No. 2,749,143 in several major ways:

1. It fully complies with the National Highway Traffic Safety Administration orders to provide for passive type of passenger restraining system for automotive vehicle users.

2. It is so designed that the table will extend even against the occupants' will, once the predetermined speed is reached, and it cannot be retracted as long as the vehicle is in motion.

3. Under collision impact, energy absorbing knee-shields are automatically positioned in front of occupant' knees, thus preventing submarining of his torso and absorbing majority of the G load.

4. A unique system of linkage balances the G load of upper torso through the chest and shoulders against the G load of the lower torso through the knees and saves the abdominal region from dangerous compression and the table edge intrussion.

5. Under impact, it automatically extends a chin-guard to prevent face and head injuries and their forward whiplash.

6. Under impact, it not only reduces the "free flight" of the upper torso, but cushions its "ride down" by gradually increasing the shock absorbing capacity of its pressure sensitive system to suit the need of the moment.

7. It prevents unwanted lateral movement of the torso in side collisions by either fixed or adjustable "wing panels" to accommodate one or a plurality of passengers.

8. The system is adaptable to any existing, economically available sources of power, which is used primarily only to extend and retract the device, while the true injury preventing and life saving action is produced by the G forces of the vehicle and its occupants; thus the speed and magnitude of the cure is directly proportional to the speed of the vehicle and the weight of occupants.

9. It is absolutely failproof in its protective function, and in case of any power failure, it may be operated by hand.

10. It has instantly adjustable angle of incline in relationship to the user's torso, and has a bib section facilitating its tilting.

Other novel and useful improvements over my U.S. Pat. No. 2,749,143 will become apparent from the present disclosure, only the basic operative principle of the tilting of the table is unchanged, simply because there is no better way.

When the seat is occupied, the safety-table will stay retracted, unless the passenger extends it himself by using proper control; however, once the vehicle moves past the preselected speed, like it or not, the table will be slowly, gently positioned over his lap, and stay there, regardless of anyone's action. While the automatic extension of the table is up to such a point where it will restrain the occupant in the seat in a collision, he may extend it further if he desires, but not retract it. Also, the vertical and angular tilting is controlled by two separate means. The knee shield is extended together with the table, but it is out of the way in front and above his knees. The only way the table may be retracted is to stop the vehicle and actuate the proper control.

Thus, the occupant may stubbornly ignore the table automatically put over his lap when the vehicle assumes certain speed, or he may make himself more comfortable by adjusting it to suit his desires; to rest his arms on its, to adjust it to accommodate his girth, or to adjust its angle for use as a pillow; he may use it for reading, writing, snacking and any other activity requiring use of a table or a tray; and everyone knows you can sit longer by the table than on a bench seat with your elbows on your lap.

However, in case of a sudden deceleration or a collision, the safety-table instantly, automatically does three things: the vehicle inertia and the G load of his torso tilt the table on its transverse axis, arresting his upper torso, a chin guard springs up from the rear edge of the table to stop his head from whiplash and a knee-shield is positioned in front of his knees, thus keeping his torso in sitting, slightly jacknifed position for the duration of the crisis — be it light or severe, five milliseconds or five seconds long.

Thus his total G load is transferred through his knees, thighs, chest and shoulders into the supporting structure of the Safety Table and through it to the structural members of the vehicle, while his relatively vulnerable abdominal region, with his face and head taking minimum punishment, while the wing-like panels of the table will keep him from sliding into either side of the vehicle during side impacts and roll-over accidents.

One relatively large restraining area of the table is acting against the relatively strongest part of users' torso — his chest, while the other, the knee-shield, is acting against his knees, which are even better suited to absorb the G load of a collision.

The whole automatic deployment is initiated by the weight sensor means in the seat cushion and triggered into positioning by the vehicle speed sensor, and in case of either power or sensor failure the system is operable by hand. It is easily repaired, instantly inspectable and readily reusable except in the most severe collisions. But the paramount reason why this device is superior to all others is its dual function; COMFORT table all of the time and SAFETY table in trouble time; thus, one does not have to have a collision to "get his money's worth". Many other improvements and advantages of the present invention over the existing art will become more apparent from a study of the following description and accompanying drawings.

DESCRIPTION OF THE PREFERRED EMBODIMENTS

In order to avoid needless repetition, many of the conceptual and structural details which have been described and explained in my patent No. 2,749,143 will not be dwelled upon in detail, since anyone skilled in the art will readily see the comparative similarities of the two disclosures and many possibilities of interchangeable combinations of their embodiments. Also, this disclosure is directed first to the passive, or automatic operation means of the above mentioned invention, and then to the major additions to it, such as the knee-shields, the shock-absorbing tilting of the table, the chin-guard, side-wings and other novel improvements and additions.

FIG. 1 is a diagrammatical side elevational view showing a safety device constructed in accordance with the principles of the present invention, as it would be adapted to the front seat of a vehicle, without the knee-shield, shock absorbing tilting means and the chin-guard;

FIG. 1-A is a fractional detail showing another way of storing the Safety-Table;

FIG. 2 is a diagrammatical side elevational view of another embodiment of my invention;

FIG. 2-A shows minimal limit control.

FIG. 3 is a fractional diagrammatical side elevational view showing still another modification of the installation;

FIGS. 4, 5, 5-A, 6, 7, 7-A, 8, 9, 10, 11, 12, 13 and 14 are fractional diagrammatical side elevational views of various modifications of my invention;

FIGS. 15 and 16 are fractional diagrammatical side views of prefered weight sensor means;

FIG. 17 is a sectional detail view taken substantially on the line 17—17 of FIG. 18;

FIG. 18 is a perspective view showing in more detail the pivoting, shock absorbing, tilting and tilt adjusting means;

FIG. 19 is a diagrammatical side elevational view of another modification of my invention; including the retractable knee-shields and the chin-guard;

FIG. 20 is an enlarged side elevational view of the mechanism actuating the knee-shield and the chin-guard;

FIG. 21 is a detail side elevational view showing the apparatus for operating the chin-guard;

FIG. 22 is a perspective view of my safety table with the chin-guard extended;

FIG. 23 is a perspective view showing another modification of the knee-shield actuating mechanism;

FIG. 23-A is a sectional view of the collar assembly used in FIG. 23;

FIG. 24 is a perspective view of the table panel equipped with an air cushion;

FIG. 25, 26, 27 and 28 are perspective views of the table showing varied modifications of it to prevent lateral sliding;

FIG. 29 illustrates several possible combinations of modified lateral wings and various degrees of padding of the table;

FIG. 30 illustrates several modifications of the very minimal configurations of my invention.

Figure 1:
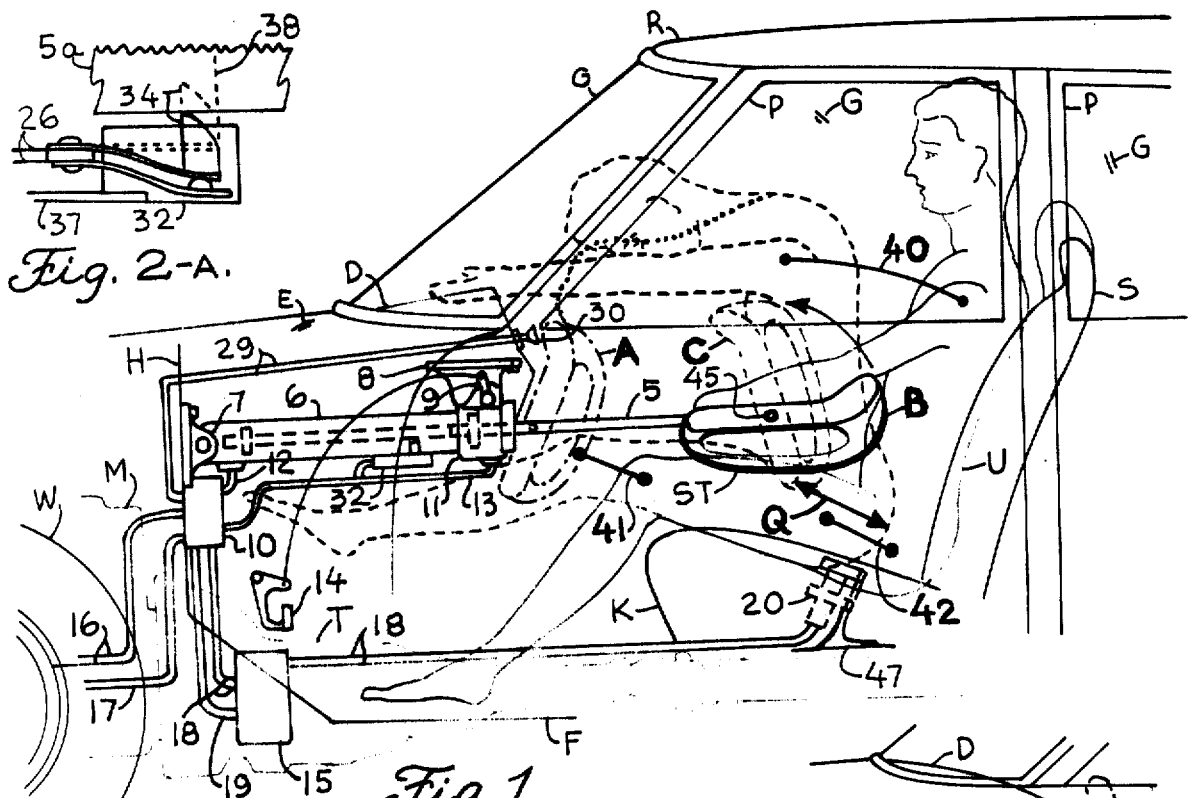

Referring now to the drawing in FIG. 1, which illustrates an adaptation of my safety table to hydraulically operated, passive, or automatic actuation, reference character U designates an occupant of a seat cushion K, with the seat-back cushion S, sitting behind the safety table ST, which is attached to the dash board D and the firewall H, while the floor F, the body enclosure E, pillars P, the roof R and the glass panels G generally define the passenger enclosure of a vehicle, while the wheels W, with the power means M and the power transmission system T denote its means of locomotion. In this embodiment the system is actuated by various hydraulic means. The safety table is shown in three basic positions: the stored position A, the extended position B and the tilted position C.

The safety table ST is supported by two rods as 5 which are part of a double-acting, single-stage hydraulic cylinder assemblies 6 which are secured to the firewall H by pivotal brackets 7 on their forward ends, and by holding brackets 8, which are attached to the rigid structural bulkhead of the vehicle supporting the dash board D. The bracket 8 is adapted to have releasable means 9, remotely operable by control 14, which allow the housing 11, supporting the hydraulic cylinder 6 to be raised or lowered, thus allowing the assembly to pivot at bracket 7 and thereby raise or lower the table ST over the user's lap as desired and keep it at that height even for repeated usage.

The hydraulic cylinder 6 has front hydraulic connection 12, and rear connection 13, which are connected to the main operational control relay means assembly as 10. Electric power supply lines 16 and hydraulic power supply lines 17 are connected to proper sources and also enter said control box 10, which also has connections with the speed sensing means as relay 15, which may be connected to either the transmission T or to an odometer means (not shown) by lines 19, and to the weight sensing means 20, located strategically in the seat cushion K by electrical lines 18, and also to the manual control means as 30 by electric control lines as 29.

Thus, when the seat is not occupied, the safety table ST is recessed either against the dash board D, as shown at A, or under it as shown at AAA in FIG. 1-A or to make a shelf as at AA. Nothing happens when the seat is occupied and the vehicle is motionless, unless the occupant desired to extend the table in front of him using control means 30; however, when the vehicle starts moving past the preselected speed, the seat weight sensor 20 being already activated, in combination with the activation of the speed sensor 15, the control panel 10 will cause the table ST to be slowly extended to its minimal protective position over the occupant's lap as determined by the extention control means 32 attached to the cylinders 6; however, if the table is already extended past the minimal extension, nothing happens, except the table is impossible to be removed until the vehicle is stopped and the control 30 actuated. Should the occupant try to outsmart the system by removing it when stopping momentarily for traffic signal or any other reason, the table will again extend to the minimal position when the vehicle resumes the predetermined speed.

The function of the control means as 30 is as follows: it extends the table at anytime, it removes it when the vehicle is stopped, and it controls the movement of the table between the minimum and the maximum extension.

Once the protective element is positioned as desired, the hydraulic fluid in the cylinders would act as a shock-absorbing cushion whenever the occupant's torso would be pressed against the table ST and its inertia load would be transferred through the table panel and the cylinder rods as 5 into the hydraulic fluid in the cylinder. Another variation if possible wherein the hydraulic cylinders are of the single-acting single-stage type, thus providing power for the extension of the table and allowing slow retraction under pressure by means of modified bleeding; and if the system be disabled, it could be retracted by simple, steady pressure against it.

Figure 2:
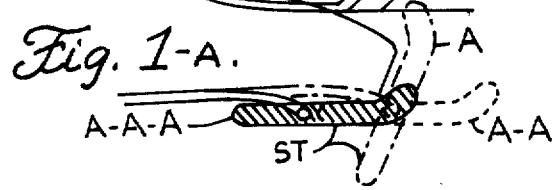
Figure 2:
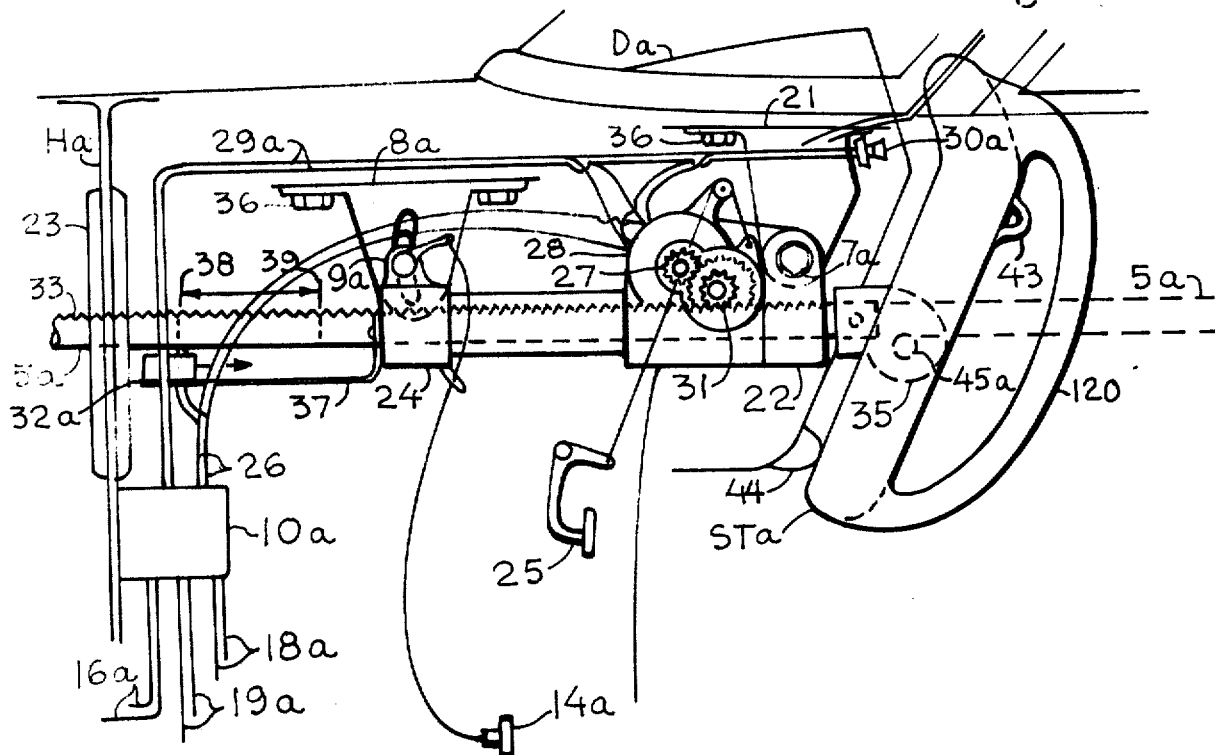

FIG. 2 illustrates an adaptation of my invention for automatic, passive operation using a combination of electro mechanical means of operation. The table ST$a$ is attached to the bars 5$a$ by modified pivot blocks 35, while the actuating assembly is pivotally attached as at 7$a$ of the mounting bracket 21 by means as 36 attached to a rigid structure of the dash board D$a$. The forward end of bar 5$a$ is slidably held by adjustable bracket 24, secured by means as 36 to a rigid member of the dashboard, containing releasable locking and positioning means 9$a$ operable by release and lock control means 14$a$ to allow for vertical adjustment of the table over the user's lap. If necessary, the firewall H$a$ may have openings in it for gaskets 23 to allow the bars 5$a$ to pass through it when the table is recessed.

The main operational control and relay means as 10$a$ is connected to the power source, such as battery or a generator by electric wires 16$a$, to the seat sensor by lines 18$a$ and to the speed sensor by lines 19$a$, and it provides power by lines 26 to the reversible electric motor as 28, which through its reduction means as 27 engages reduction gear assembly as 31 to engage with the teeth 33 of the bar 5$a$. In case of a power failure, pressure on the lever 25 will disengage the gear 31 from teeth 33, allowing the table to be moved freely; to the slidable bracket housing 24 is slidably attached electric sensor means 32 by adjustable bracket as 37 which establishes the minimal extension of the table. As shown in FIG. 2-A, the insulated dog 34 slides along the bar 5$a$, thus keeping the circuit to motor 28 closed, until the end of the bar 5$a$ passes the point 38; from there to the maximum point of extension at 39 is the "convenience" zone in which the occupant may position the table at will by means 30$a$. The resilient bumper 44 keeps the table from rattling while stored and the hooks as 43 are for auxiliary straps for use with children and invalids.

FIG. 3 illustrates an adaptation of my invention wherein the table supporting bars 5$b$ are configured to fit into more restricted space and the assembly is designed accordingly. The lock control 14$b$ permits the table vertical adjustment between arrows 49, and the minimal extension sensor 32$b$ allows the longitudinal adjustment between points 38$b$ and 39$b$. Otherwise this modification is very similar to the one explained in FIG. 2.

FIGS. 4 through 14 show my invention as it could be adapted for the back seat occupants and therefore the table element would be wider to allow for plurality of passengers, but it is also very obvious that all of them could be adapted for the front seat use. In FIG. 4, the table ST$c$ is supported by curved bars as 5$c$ pivotally secured to it as at 45$c$ and on their lower ends pivotally mounted by means as 46 to the pillar as P$c$ or any other suitable, rigid member of the vehicle structure. The hydraulic cylinder as 50 is pivotally attached by means as bracket 52 to convenient rigid body structure such as pillar P$c$, and the piston rod 51 is pivotally attached to the bar 5$c$ by pivotal means as 53. The minimum extension sensing means as 32$c$ are connected to the main operational control and relay means as 10$c$. When the weight sensor is activated and the vehicle reaches predetermined speed, the hydraulic pressure through tubing as 12$c$ is permitted to extend the rod 51, thus positioning the table as far as the minimum extension sensing means 32$c$ allows it; if further extention is desired, it is done by using hand-operated control means 30$c$ located for users convenience.

Another simple modification of this arrangement is to substitute means 46 with any of the electrically operated gear sector means as explained in FIGS. 5, 6, 8 or 11, and use modified automotive shock-absorber in place of the hydraulic cylinder 50, thus creating a system which would work as follows: the gear-sector would position the table, but the shock-absorbers would take the G load under impact and allow slow retraction, thus prolonging the deceleration time for the torso.

FIGS. 5 and 5-A illustrate the use of modified gear-sector principle combined with ratchet and electromagnetic pawl to produce very simple and economical embodiment of my invention. The table ST$d$ is tiltably secured by means as 45$d$ to curved bars 5$d$ which are provided on their lower ends with gear sectors 48, pivotally connected at 46$d$ to the housing and plate assembly 54, which may be attached to either the pillar P$d$ or any other conveniently located structural member of the vehicle by means as 36$d$. The gear sector 48 is operatively connected with reduction gear as 31$d$ and gears as 27$d$ to the reversible electric motor as 28$d$, which is powered through wires 26$d$ from the main control box 10$d$, receiving signals from the weight sensor 20$d$ through wires 18$d$ and from the speed sensor 15$d$ by wires 19$d$; wires from the hand control 30$d$ as 29$d$ complete the assembly for its operation. The bracing bar 55 is pivotally connected to the main bar 5$d$ at 53$d$ and its other end is configured to slidably operate within the brace housing 56, which is secured to the structural member of the vehicle such as post P$d$ by securing means as 36$d$ and which has an elongated slot 58 comprising on one side ratchet bar with teeth 57 which operatively engage with the electromagnetic pawl 60 connected by wires as 29$d$ to the main control box 10$d$. The minimal extension sensor as 32$d$ may be located either in the lower housing 54, or in the upper housing 56, and the electromagnetic pawl 60 works on the same principle as the electric door openers do in public buildings. When the table is being positioned from A$d$ to B$d$, the pawl just glides down the slot 58, but it will not allow retraction from any point unless the hand control 30$d$ will release it, or when retraction is signalled from the control box 10$d$.

FIG. 6 illustrates even more economical embodiment of my table. Basically it is the same as described in FIG. 5, except that the main bars 5$e$ are even shorter, and configured to fit into the most compacts, or for installation in public conveyances where multiple units could be activated by its operator by one central control. The main bar 5$e$ is solidly secured to the gear sector 48$e$ which is activated by reduction gears 31$e$ and 27$e$ driven by a reversible motor 28$e$ mounted to the housing 54$e$. Where the seats are solidly attached to the vehicle structure, as in buses, the unit could be easily mounted to the back of the seat directly adjacent to it.

In modification as explained in FIG. 7, the table as ST$f$ is pivotally secured to bar 5$f$ pivotally mounted on the lower end by means as 46$f$ to the plate 54$f$ and by it to the vehicle structure by means as 35f. The shorter bracing bar 55f is pivotally secured to 5f at 53f, and its upper end is pivotally secured to the housing of a reversible electric motor as 28f which comprise proper reduction means to enable it to drive up and down the slot 58f of the upper brace housing 56f, as shown by arrows 61, and the rack 62 would transfer the G load from the table to the vehicle structure. This design would lend itself to central vacuum or hydraulic operation by putting vacuum cylinders where the slot 58f is positioned, and have all the mechanism concealed in the seat structure.

FIG. 7-A shows another embodiment of my invention, wherein it may be easily modified for use in multi-seat vehicles, such as buses, planes, trains and other fast moving public conveyances; although they very seldom experience collision problems, this device could be offered to traveling public as a convenience and comfort feature, and safety would be just an added bonus. If all seats were equipped with these economical, foolproof tables, they would be connected to one central control operable by the operator of said conveyance, or to appropriate sensor means, and in an emergency they would all be positioned remotely, at one time, and automatically, even against the passengers' consent, but they would be retractable only by hand. The seat sensor means could be used and then only the occupied seats would have their tables positioned.

During normal travel, after passengers would be seated, they could ignore the retracted table, or, by pushing the release button as 30f let the table drop over their lap and use it, and retract it anytime by simply releasing the lock means as 30ff and push it up until it locks in the retracted position again. The central trigger control or any sensor means used would serve only to release all the controls as 30f, but the units would have to be stored by hand, for economic reasons, and the releasing could comprice electromagnetic catch release as used in public buildings for doors, operable by hand or remotely. The housing as 56f could be mounted to the adjacent seat, or the adjacent structure of the vehicle, and it would use a strong compression spring kept compressed when the table is recessed, which when released by 30f, either by hand or remotely, would propell the pivotally slidable bracing arm 55f as indicated by arrow 61f to position the table over occupant's lap and lock in that position by means as 30ff. Of course, those tables which would be already thus positioned by their users would be undisturbed. In commercial planes, instead of signaling passengers to fasten their belts, the pilot would simply let the tables position gently over their laps, as by vacuum or hydraulic means, and when the all clear signal would go up, he would release the control and people could either use them or put them in the stored position.

FIG. 8 shows still another configuration of my invention, wherein the gear sector as 48g is actuating the bracing bar 55g instead of the main support bar 5g, with this advantage: under impact, the table is braced solidly at 46g and at the upper point of sliding slot 63, thus its upswing is almost impossible, creating very rigid supporting structure for the table without any need for ratchet and magnetic pawls with wiring. The safety table STg if tiltably attached at 45g to the main brace-bar 5g, which is adapted on its lower end by modified sliding means as 64 to slide freely in slot 63 of the housing 56g secured to the vehicle structure by means as 36g, while the bracing bar 55g is pivotally secured to the main bar 5g by pivotal connection as 53g, and its upper end is secured to the gear sector 48g of the gear housing means operable by reversible motor 28g controlled by wires 26g from the main control system.

The embodiment shown in FIG. 9 employs the principle of modified "scissor jack" means to position and support the table STh which is tiltably secured to it as at 45h. The unitized housing 66 is secured to proper rigid part of the vehicle by means as 36h and on one end it comprises an assembly of reversible electric motor 28h with reduction gears 27h and 31h to rotate acme threaded shaft 68 which is rotatably secured at its other end to the flange of said housing 66, to form a very rigid structure with it, the threaded sleeve 67 is attached to the lower pivot joint of the supporting assembly 65, and adapted to operatively slide in guide means 69 while being moved up and down by shaft 68, while the upper pivot joint of 65 is secured pivotally to the upper flange of said housing 66. Thus the motor turns the shaft 68 left or right, making the threaded sleeve 67 go up or down as indicated by arrow 61h and thereby extending or retracting the table STh as desired.

FIG. 10 shows another embodiment of my patent using double-acting vacuum means or hydraulic cylinders. The table STk is tiltably secured to the base plate 70 which is attached to the vehicle structure as by 36k. Also attached to said base is the hydraulic cylinder 50k, with its piston rod 51k pivotally connected as at 71 to the backing bar 55k which in turn is pivotally attached to the main bar 5k as at 53k. The hydraulic lines 13k and 12k actuate the system, and the shock absorbency of the table may be easily controlled by increasing or decreasing the pressure in the system.

FIG. 11 shows another modification of my invention, using the common automotive window regulator motors as 28m with reduction means as 27m for its operation; driving gears 31m which engage with the gear sector 48m secured to the bracing bar 55m, which has its other end pivotally secured to sliding collar means as 71, operatively slidable over the main bars 5m. The operative assembly is mounted on base plate 70m and secured either to the pillar Pm or other rigid structure, and the main bar 5m is pivotally secured by means as 46m in similar fashion. The reversible motor 28m will rotate the bracing bar 55m up and down with equal ease and thus position the table as desired and keep it exactly there, because there is no pressure of any kind to worry about. This embodiment offers endless combinations of the main bar configurations, such as length, bends, and connections of the various elements to each other as well as to the adjoining structures and may be easily fitted into any location and any seat, front or rear.

FIG. 12 is a perspective diagrammatical view of the embodiment as explained in FIG. 11, except that only one motor as 28n is used to position the table STn. The base plate 70n, comprising the motor 28n with proper gearing as 27n and 31n may be mounted on the transverse beam structure 72, as long as all three pivotal bracing bars 55n pivot on the same center line CL; this also applies to the center lines of the bottom pivotal anchor means as 46n securing lower ends of main bars as 5n to the vehicle body. As is shown by the dotted line on the near side of the structure, if the pivotal anchor plates 46n could be replaced by a bracket means as 75 mounted on said transverse beam 72, then the shaft as 76 could connect with the pivotal end of the bracing bar 55n thru the bracket 75, as indicated by center line CL and make all three main bars power operated.

In FIG.. 13 are incorporated two very similar embodiments of my invention, wherein the table is stored against the roof panel Ro when not used. The base plates as 70o may be mounted wherever opertively suitable; on the door pillars Po, the transverse bar back of the front seat (not shown), or the rear quarter panel section, the back seat bulkhead, or any other appropriate place, such as the rigid structure of the dash-board. The main bars as 5o have their ends, which are slidably connected to the power units 70o, provided with two stops as 73, which allow for their longitudinal adjustment by simply turning wing-nuts 74 and sliding the table as desired and retightening the wing-nuts, while the vertical adjustment is provided with control means 30o.

FIG. 14 shows the very minimum embodiment of my safety table suitable for sub-compact vehicles and other installations with minimum space available. The plate 70j on which the whole operative assembly is mounted may be secured to the transverse bar, the pillar or any other available means, such as the rigid structure of the dash-board.

FIGS. 15 and 16 illustrate very simple, dependable seat occupancy or weight sensors for installation into the seat cushions of vehicles using my type of occupant restrains. In FIG. 15, the upholstering as 81 has attached to its underside liner by means as 36p a non-conductive plug as 77, which has conductive metal inserts as 78 attached to its lower end; underneath this installation, attached to semi-rigid member of the same seat cushion Kp, is a spring bracket as 47p, on the upper end of which is secured a non-conductive cup as 78 by means as 36p, which has its bottom section provided with two metal inserts as 80, which are attached to wires 18p. The illustration shows the sensor as it is configured when the seat is unoccupied, and the electric circuit is open. When the seat is occupied, the plug 77 slides further into the cup 79, closing the circuit between the wires 18p, and the sensor bracket has enough spring and give to it to accommodate any weight occupant, and any minor bouncing or weight shifting will not open the circuit.

In FIG.. 16 a more detailed embodiment of my seat occupancy and weight sensor is explained: in this case a sealed, dustproof assembly comprising vinyl bellows as 82 enclosing a spring contact means as 78q attached to the bottom material of said seat cushion Kq and another contact plate as 80q secured to an insulator as 84 which is supported by spring means as 83 secured to the sensor bracket as 47q which has right resiliency to take any weight without strain. Thus, when the seat is occupied, the spring contact 78q touches contact 80q and then they go up and down together, supported by the springy bracket 47a, while the wires 18q are in continuous contact until the seat is completely vacated. The switch may be converted into a weight sensor very simply by having a multiple stage switch actuating multiple stage pressure controls for actuating the table when in extended position, as indicated by vertical arrows $l - m - h$, indicatingi light, medium and heavy compression of the seat under varied loads of the user.

All the embodiments described in FIGS. 1 through 16 have been basically concerned with the task of making my safety table U.S. Pat. No. 2,749,143 completely passive or automatic in its function without sacrificing any of its comfort, convenience and safety features, and mainly its automatic, inertia triggered tilting action, which cannot be improved. However, if constructed according to the existing patent, the table, upon collision, will snap from the horizontal to the angular position without any cushioning or "give", and greater the speed of impact, the greater the "snap" with which it would tilt and stop —metal to metal — and the only "give" was in deforming of the supporting structure. Also, if the angle of the tilt was not high enough, the torso had the tendency to "submarine" under it, and if the angle was too great, there was the long, unresisted "free flight" and the possibility of hitting the vehicle interior with occupant's head.

Also, there was no support for the knees, and the total weight of the lower torso was dependent on the femu region for absorbtion of its G load, while the soft abdominal section was subjected to great pressure in cases of excessive corpulence of the user. Because in majority of collisions the occupant would end with the rear edge of the table under his armpits, his neck and head would be subjected to violent forward whiplash and his head might hit the roof channel. If the occupant positioned the table too low over his thighs, it might hook him under his rib cage and lift him into the roog panel, and finally, because the bottom surface of the old table was smooth, in lateral collisions the torso had the tendency to slide laterally and pile against the side of the interior surfaces or against each other.

All the problems mentioned above have been successfully solved as will be apparent from the following description, in which figure 17 shows schematic, fragmentary detail of the new, cushioned, shock absorbing tilting means, and the means of adjusting the angle of the table, the view taken substantially on line 17—17 of figure 18, looking in the direction of the arrows.

The main rod as 5r is securely attached to the main pivot block as 35r, using lock pin as 87, and the whole safety table STr is operatively, tiltably turning about the main bolt as 45r passing through the frame channel as 91 which is secured to the bottom panel as 89 of the table STr by such means as welds 93. Heavy plate as 85 may be welded to the bottom panel 89 so that in case the bolt 45r would shear in very severe collision, it would not penetrate through the channel 85 and the bottom panel 89. The cushion block as 90 is made preferably of any compressible, either slow or non-recovery material and is inserted into the strong steel retainer as 92, secured to the frame channel 91 by means as welds 93, and it so composed and configured that it slides easily about the smooth radial end as 99 of the pivot block 35r for the first 30° of upward tilt of the table STr, while the next 70° it is offering increased resistance to the tilting motion, until the flange of said retainer means 92 comes in contact with the top surface of the pivot block 35r, where it transfers whatever G load that remains to the steel rods 5r for further absorbtion by deformation and transfer to the rigid structure of the vehicle.

The area of heavy cross hatching on top front of the cushion block 90 indicates very important feature of my invention; it is the area of comfort-zone tilt. If the forward point of the cushion block 90 is back of the vertical center line of the pivot bolt 45r, the table will tilt the first 30°, as indicated by the arrow 2=30, without any resistance whatsoever — but every milimeter that the said forward point is placed in front of said center line, the amount of the free tilt is reduced and the cushion 90 will offer increased resistance to the tilting movement; thus it may require 10, 30 or 60 pounds of push agains the back edge of the table to tilt it the first 30°. Thus, in fact, if the cushion 90 was constructed in the shape as shown in the drawing, including the heavy shaded area, the table would offer increasingly greater resistance to tilting right from the horizontal, so the table would have to be pushed up and then locked in that position by means as 95 or 96 to suit the occupant's desires. The cushion block is easily removable and replaceable and comes in varied forms and degrees of compressibility, thus allowing insertion of proper types for every anticipated need, or it may be made in two parts: the lower section as shown in FIG. 21 at 90t would be for real collisions, with very low or no rebound, while the upper part as 109 would be interchangeable and easily replaceable and made in various shapes and hardnesses. To provide for the angular adjustment of the table to suit the occupant's comfort, the sliding sleeve as 95 operatinig with the rod 5r has an extension means as 95r comprising modified roller means as 94, which roll back and forth against the block 35r and against the main bar 5r, thus changing the angle between the inner surface of channel 91 and the bottom of block 35r and the rod 5r.

Another means of tilting adjustment is shown in FIG. 18, wherein the tilting lever as 96 is connected to cam means as 97, and the two are slidably operable within the slot as 98 in the walls of the channel 91s; thus, for small angles, the cam is left flat, but for greater angles the tilting lever 96 is flipped so that the cam is vertical and creating higher block between the inner surface of channel 91s and the bottom surface of the block 35s and the rod 5s.

FIGS. 19, 20, 21, 22, 23 and 23-A are disclosing two more major improvements of my present invention over the existing art: the automatically deployed knee-shield and the chin and head-guard which has several preffered embodiments as follows:

A. BUILT-IN, wherein the basic table, configured as shown in perspective in FIG. 23, with the "bib" part as 115 being a permanent part of the table; it would allow the elbows to rest on each side of it, with the "bib" between them and little higher up the chest, but under impact this "bib" would slide under the chin of the occupant and his upper arms would embrace the 115 section from both sides. Of course, the back edge of 115 could have an extra bit of padding for the chain and could be shaped in form of a collar as shown by dotted lines 115w.

B. AUTOMATICALLY DEPLOYABLE, wherein the table, basically as above, but the "bib" 115 would not only protrude out permanently, but under impact would extend even further out, separating at the dash line 115x, thus extending the distance between the front edge of the table to the extended back edge of the chin-guard to protect even the longest torso (between the top of the thigh and bottom of the chin when sitting).

C. COMBINATION of the above with any other sundry considerations,such as where the basic table shape would be rectangular and the chin-guard would deploy on impact, and other ways as will be explained further on.

The automatic deployment of the chin-guard will occur only on real severe deceleration of actual collision, and is completely automatic and failproof. As shown in FIG. 20 and in more detail in FIG. 21, the cushion block as 90t is modified to take a trigger release means as 105, which, while it forms hard cover for the cushion block also releases the head and chin-guard extension of the table when a collision occurs. The table frame channel 91t is configured to operatively, slidably take into its rearward hollow portion tubing means as 101, conforming in their sectional shapes with eadh other so that 101 will freely slide inside of 91t and a strong compression spring means as 104 operably, slidably fits into the means 101; and is secured on one end to the deployable chin-guard 102 and its other end to the holding clip as 103, which is secured to the flanged channel 91t. The cushion block 90t is in two parts, the softer 109 being replaceable and of varied compression characteristics as explained in FIG. 17. Under normal conditions the chin-guard 102 is recessed against the back edge of the table STu as shown in FIG. 20. The spring 104 is locked in compressed position by the trigger release means as 105, which has its inner end forming a hook as 106, which is engaged with the slidable telescopic chin-guard support channel 101 through a hole as 107 configured at its front edge to accept the hooked end as 106 of the trigger release 105. Thus, the table may be tilted any amounts up to the 30° preselected and the chinguard will not deploy; only after the table is tilted past the 30°, and the cushion block 90 will start compressing, the front edge of the trigger release 105 is going to be pushed back radially until its inner hook 106 will pull out from the hole 107 in channel 101 and the compressed spring 104 will slide the chin-guard out, with the holding clip 103 stopping it from complete ejection. Unless deformed in the collision, the chin-guard may be reset by simply pushing it back until its channel 101 snaps over the hook 106 again. The chin-guard 102 could be of varied shapes and configurations and covered with softer materials than the rest of the table, and it could have the channels 101 connected with a panel as 111 shown in FIG. 22, to provide continuous flat surface with the table. It is obvious that the tilting embodiment as explained in FIG. 17 and FIG. 18 may easily be combined with the chin-guard triggering embodiment explained in FIG. 20, 21 and 22, since it would be difficult to explain both functions in one view, and also that there are many other variations of this basic, simple device possible and therefore the above disclosures could be greatly expanded without departing from my basic invention.

The automatically deployed knee-shield L is described and shown in FIG. 19, showing it as it coordinates in overall view, and in more detail in FIG. 20, which is a schematic cross sectional view in side elevation showing the general operative apparatus as it would be configured for two-rod actuation, while FIG. 23 is a schematic perspective showing one-rod actuating modification.

As shown in FIG. 20, at the forward portion of the table STu, by a swivel joint melans as 108 is secured a knee-shield actuating rod as 110 which has several inches of its other end threaded and slidably, operatively passing through sleeve means as 112 pivotally attached by means as 36u to the knee-shield Lu. Around the rods 5u are positioned operatively slidable sleeves as 113u to which is pivotally attached, including spring means as 114, the knee-shield Lu which is so configured that it will be practically invisible when the table is retracted as at LA in FIG. 19, and even when the table is extended for use in a location as B, it is still out of the way, without interfering with occupant's knees as indicated by LB, and only under crash conditions, when the table is tilted past the initial crash zone C toward CC that the knee-shield will be pulled downwardly to the position LC, but with the same velocity as the table is being tilted forward to its position CC. This unique arrangement of positively coordinated control of occupant's cinematics is making the G load of the upper torso, as absorbed through the chest, to resist the G load of the lower torso, as absorbed through the knees, actually creating a see-saw effect between the two loads and cancelling each other, while transferring the total inertia load to the supporting rods and the rigid body structure.

The spring means as 114 will lift the knee-shield out of the way as soon as the table relaxes from its crash position and the distance between the swivel joint 108 and the slidable collar 113u is adjustable by means as the nut 73u, so that when the table is recessed agaist the dash-board D, the rod 110 slides through the collar 12 allowing the knee-shield to be stored under the dash board, as shown in FIG. 19 at LA. As shown in FIG. 20, the rod 110 could be easily replaced by more economical means as chain and cable 110. When the table is positioned over the user's lap, he may turn the nut 73w either way to suit the length of his lap, and the system may be readily tested and tried to see where the knee-shield would match his lower torso; thus in a collision his knees and chest would carry the biggest G load and his soft stomach region and his face would be fully protected. Vise-gripp as 124 is provided to cooperate with the slidable collar 113u, so that whtn the knee-shield is recessed, the collar slides freely over the rod 5u, but in a collision, the moment the knee-shield starts down, it releases the catch on the vise-grip 124 and the collar 113u locks on the rod 5u. If the rod 110 would be replaced by cable, several links of a chain on the forward end would provide for the longitudinal adjustment of the knee-shield.

In FIG. 23 and 23–A is another modification of my safety system, using only one rod as 110w to actuate the knee-shield, attached to the front edge of table STw by a swivel joint as 108w, with its other end slidably opeative through the pivotal sleeve as 112w which is provided with two spring means as 114w to urge the knee-shield into horizontal position, and secured by means as 36w to the kneelshield Lw. Sleeves as 113w allow the knee-shield to slide under the main rod 5w and to pivot downwardly from it when activated by the rod 110w.

In reviewing the merits of the three major advantages disclosed in this invention, namely the cushioned tilting of the table, the automatic knee-shields and the chin-guard, let us compare the FIG. 1 and the FIG. 19. In FIG. 1, without the chin-guard and the cushioned tilting, the upper torso and the head are subjected to very long "free flight" and no "ride down", while in FIG. 19 there is no "free flight" to speak of, since the table offers its increasing resistance right from the onset of the tilting motion and the "ride down" starts right from position B to position CC. The total G load of the torso, as shown in FIG. 1, table position C, clearly indicates that the harder the impact, the harder the pressure on the femur and the soft abdominal region, especially in case of corpulent people, while from FIG. 19 it is obvious that most of the lower load is carried by the knees, which are stronger.

FIGS. 24 and 30 illustrate just a few of the infinite number of possible shapes and configurations that my invention may assume without departing from the proper scope of fair meaning of it; just like there is no end to the "model changeover" in the automotive design, so there is no end to these modifications. FIG. 24 shows a table with automatically releasable or manually extendable chin-guard 116 and side-wings 120, together with an optional air cushion 118 which is attached by means of snaps between the wings and the bottom side of the table. The extension would be mounted by conventional telescopic assemblies. Of course, the air cushion could be relaced with any other type of soft material which would wrap around the torso under impact.

FIG. 25 shows another modification wherein the wings 120 are of modified shape, and the folding wing 121 is used if the table is used by two people or children, and the chin-guard 123 is hand insertable and adjustable for use singly or plurality in various locations.

FIG. 26 illustrates my device adapted for invalids and children with optional, removable chin-guard 123 and provision as 43 for auxiliary attachments.

FIG. 27 shows a wide table for back seat, wherein the two wings as 122 may be positioned in the middle, together, to accomodate two people, or they may be spaced apart to create a three passenger accomdation, with the hard positioned chin guards 117 located as needed.

FIG. 28 shows still another rear seat modification wherein all side wings as 121 are of the folding type, providing a large, unobstructed barrier for bulky objects or accommodating a plurality of passengers, with the shaped chin-guards 123 insertable and adjustable by hand as desired.

FIG. 29 shows seven miniature schematic side elevations of the table illustrating how the padding 119, the permanent chin-guard 115 and the extendable chin-guard 116 rotates endless combinations; and these are not just a matter of styling whim or fancy, but features of genuine difference in comfort, conversion, cost and safety, and even the "stripped down" versions as shown in FIG. 30 show a variety of different angles, such as 1 and 11, wherein the table would be of a one-piece molded panel, including the base housing for the pivot block 35, or vesion 111, wherein the rigid channels are added, and V, wherein the extendable chin-guard is added.

If the pivot means as 35 and channels as 91 would be of uniform dimensions and spacing, and the bolt as 45 of the quick release type, there is no reason why the tables themselves could not be exchangeable from car to car, model, size to size and shape to shape.

It is obvious that his invention is susceptible to great modification of appearance and that various changes in arrangement and structural detail may be made by a person skilled in the art to which the invention pertains without departing from the spirit and essential characteristics thereof, and thereof the present embodiments are to be considered in all respects as illustrative only and not restrictive, the scope of the invention being in-

I claim:

1. In a safety device for protecting an occupant of a transportation vehicle seat including an occupant compartment defined by a seat and a rigid structure spaced adjacently to the seat, a protective element having a relatively narrow surface and a relatively wider surface portion, means including a supporting structure attached to the adjacent rigid structure of the compartment for adjustably supporting and automatically positioning the protective element in an active position in proximity to said seat with its wider surface portion substantially horizontal and extending in proximity to the occupant and transversely to and higher than the seat-cushion and removing it there-from to a stored away from the proximity to said seat, means tiltably connecting said protective element to said supporting structure for tiltable movement about an axis transverse with respect to said seat whereby said wider surface portion of said protective element may be turned from said horizontal position to a position wherein it presents said wider surface portion toward the torso of the occupant of said seat when any forward pressure is exerted against the rear edge of said protective element as when the occupant moves forwardly as a result of any sudden deceleration of the vehicle and his torso is forced against said protective element, wherein said means for the automatic positioning of said protective element is controlled by two sensing means: a first one for sensing when said seat is occupied and second for sensing when said vehicle reaches predetermined forward speed, the two sensing means acting in sequence and being in series with each other effecting the actuation of said means for automatic positioning of said protective element into proximity of said seat only when both of them are actuated.

2. In combination with means as set forth in claim 1, wherein said occupant compartment is the front seat compartment of a passenger type of vehicle; said adjacent rigid structure is the vehicle's dash-board; said supporting and positioning structure is attached to the rigid sections of the vehicle structure in front of said seat; said protective element is configured in shape of a table-top panel which is retractable against said dashboard when said seat is not occupied and is automatically expandable over said occupant's lap when he occupies said seat and said vehicle reaches predetermined forward speed; means to prevent said protective element from being removable from its proximity to said seat unless said vehicle is moving at less than the predetermined forward speed and a special control means is activated.

3. In combination with means as set forth in claim 1, wherein said means for automatic positioning of said protective element is controlled by two electrically powered actuating mechanisms: a first one for sensing when said seat is occupied and a second for sensing when said vehicle reaches predetermined speed, the two acting in sequence: the first one comprising a weight-responsive device for sensing if a weight greater than a predetermined value is present in said seat, and which is operable to actuate an association first control means in a circuit with said safety device when the weight greater than the predetermined value is sensed; and the second one being a speed responsive device, attached to the propulsion system of said vehicle for sensing when it is traveling at greater than preselected forward speed and which is operable to actuate an associated second control means in said circuit when said predetermined forward speed is sensed; said first and second control means being in series with each other and effecting actuation of said means for automatic positioning of said protective element only when both controls are actuated and said electrical circuit is completed.

4. In combination with means as set forth in claim 3, wherein said circuit is an electric circuit and said first and second control means comprise switches being actuated from normally open to a closed position; the first by said weight responsive device and the second by said speed responsive device to complete said electric circuit, thus causing actuation of said safety device to position itself in predetermined minimum proximity of said seat, including means whereby it will be impossible to remove said device from said minimum proximity as long as said vehicle is moving faster than a predetermined speed.

5. In combination with means as set forth in claim 3, wherein said means of automatic positioning of said safety device comprise a reversible type of electrically powered motor means, controlled by said seat-occupancy sensor and said vehicle-speed sensor with their operative sequence so configured that once the protective element is positioned in its proximity to said seat it will remove itself only when said vehicle is motionless.

6. In combination with means as set forth in claim 3, wherein the extent of the positioning ability of said protective element is divided into two zones: the automatic zone, covering the distance from its stored position to the minimum predetermined position of proximity to said seat at which it would offer proper protection to its user under severe deceleration conditions of the vehicle, and to which it is automatically extended when said seat occupancy and vehicle speed sensors are activated and said activating circuit is closed, and the optional zone, which extends from said minimum proximity to the furthest extension that the system will allow when said actuating circuit is opened by means sensing the extension of said support structure, including means permitting its user to adjust said element back and forth within said optional zone at all times by selectively closing and opening said actuating circuit.

7. In combination with means as set forth in claim 3, comprising hand operated remote control means whereby said protective element may be positioned into and out of the desired proximity to said seat, even when said vehicle is motionless and said seat unoccupied, but once it is extended past its minimum predetermined proximity to said seat, it will be impossible to remove it further unless said vehicle is moving below its predetermined speed.

8. In combinations as claimed in claim 3, comprising "fail-safe" emergency means configured to allow the seat occupant to be able to position and adjust said protective element into and out of the desired proximity to said seat by manually actuated means at anytime said automatically positioning means should fail to function, by activating the means which will disengage the actuating mechanism of the system and permit extension and retraction of said protective element into and out of any desired position while still providing protection for its user.

9. In combination with means as set forth in claim 1, wherein said supporting and positioning structure comprise a plurality of spaced-apart rigid supporting arms means, their reward ends configured to extend into said protective element for limited tilting attachment to it arranged upon its transverse tilting axis, and adjustable one way stop means located in proximity to the junction of said arms means with said protective element limiting its tilting about its transverse axis in one direction but allowing it to be freely, easily tiltable in the other direction at all times.

10. In combination with means as set forth in claim 1, wherein said protective element is configured in form of a modified table tray to suit the physical proportions of its user's seated torso and pivotally connectable to said supporting structure by easily removable and replaceable bolt means, thereby permitting easy exchange and attachment of variously configured elements to said supporting structure to accommodate the seated torso of the person who is about to use said seat.

11. A combination as defined in claim 1, wherein the means of tiltably connecting said protective element to said supporting and positioning structure comprise specially configured reinforcing channel means configured for pivotal engagement with said supporting and positioning structure and comprising resiliently compressible means positioned in such manner whereby they offer increasing resistance to the pivotal movement of said protective element about its transverse axis as the compressible means abuts said supporting and positioning structure.

12. In combination with means as set forth in claim 9, comprising adjustably operable one-way acting tilting means located in proximity to the juncture of said arms means with said protective element and arranged in such manner whereby said protective element may be secured in various degrees of its tilting incline about its axis from the substantially horizontal position to any degree of tilt desired by its user, said means so configured whereby said protective element will not decline from such preselected position of tilt but will be free to tilt further upwardly and forwardly about its axis at all times.

13. In combination with means as set forth in claim 1, adapted for seats accomodating a plurality of occupants, wherein a plurality of said weight sensor means are placed within the seat-cushion of said seat, and its electrical actuating circuit is so modified whereby said protective element will be positioned into proximity of said seat even if only one of said plurality of spaces is occupied.

14. In combination with means as set forth in claim 1, wherein said supporting structure for adjustable support and automatic positioning of said protective element comprise a plurality of spaced apart, rigid supporting arms positioned longitudinally to the vehicle, their back ends extending into the interior of the protective element and pivotally attached to it to define the axis of its tilting movement, their forward ends slidably, operably passing through specially configured housing means pivotally attached to the rigid adjacent structure of said vehicle occupant compartment, said housings comprising reduction gear means operable by a reversible type of electric motor, and configured to automatically position said protective element in and out of proximity to said seat by extending and retracting said arms means in and out of said rigid housing means including means to allow limited pivotal movement of the assembly about its means of pivotal attachment to said vehicle structure to permit adjustable vertical positioning of said protective element over said occupant's lap.

15. In combination with means as set forth in claim 14, wherein said reduction gear means operate a modified rack-and-pinion assembly in which said supporting arms function as the racks and the pinion gears are configured to be operatively engageable and disengageable with said arms by remote control means, thus allowing free slidable movement of said arms through said gear housings should an electric power failure occur, and remotely controlled and lockable holding means located forward of said gear housings to lock the structure in preselected degree of tilt, thus positioning said protective element at the desired vertical proximity to the top of the seat-cushion of said vehicle seat.

16. A combination as claimed in claim 1, wherein said protective element is generally flat and configured in shape of a table top and comprises a tray-like related convenience means upon its top side, while its bottom side is preferably padded and its rearwardly portion curved substantially upward to induce upward tilting of it under any pressure against its rear edge, including modified reinforcing channel-like means configured for tiltable connection to said supporting structure.

17. A combination as claimed in claim 1, wherein said protective element is configured in shape of a table top with its middle portion of its rearwardly edge extended and curved angularily rearwardly and upwardly to form an inclined bib-like extension of it to facilitate the forward tilting of said element under any pressure against its rear edge and serve as a built-in-chin-guard means for the occupant's chin when said element is tilted and its rear edge faces upwardly against occupant's upper torso.

18. A combination as claimed in claim 17, wherein said middle portion of said protective element is configured as a separate unit adapted to be manually, slidably and adjustably extendable, retractable and securable to said protective element in various degrees of extension, thus allowing the longitudinal span of said protective element to be adjusted according to the height of its user's seated torso between the top of his thighs and the bottom of his chin, thereby providing complete frontal support for his seated torso during any severe deceleration of said vehicle, with its padded rear edge serving as a chin guard and preventing dangerous whiplash of his head, and the forward edge of said protective element being positioned directly over the thighs of said seat occupant, thus restraining him from being displaced from said seat during a collision of said vehicle.

19. In combination with means as set forth in claim 14, wherein said protective element comprises modified reinforcing channel-like means for pivotally operative connection to the ends of said supporting arms, the central rearward section of said element spaced between said arms being slidably extendable by strong compression spring means enclosed within said modified channel means and releasably connected at one end to a compressible tilt-resisting means within said channels and on its other end secured to said slidably extendable section in such manner whereby said tilt-resisting means, when compressed past the predetermined degree, will release said compressed spring means and allow them to instantly extend said central rearward section outwardly; including means for easy resetting of said spring means and repositioning of said central rearward portion to its normal position.

20. A combination as claimed in claim 1, wherein the outboard sides of said protective element are configured to form thin, rigid side barriers curved angularily downwardly from its bottom side, to prevent lateral sliding of occupant's torso off said protective element during a lateral type of a collision of said vehicle, and including means for easy installation of replaceable air-cushion pillow means configured to be easily positionable between said side barriers and against the bottom surface of said protective element to cushion the impact of said seat occupant's torso against said protective element in time of a collision of said vehicle, said protective element molded from synthetic materials and configured to harmonize with the overall design of said vehicle's interior styling concept.

21. In combination with means as set forth in claim 1, wherein said protective element is adapted for use by children and invalids, comprising retaining trays and compartments in its upper surface and configured to accomodate the physical dimensions of the seated occupant, curved partially around his torso to serve as elbow rests and including means for attaching an auxiliary belt means to strap the seated person to the device, and easily exchangeable, adjustably extendable bib-and-chin-guard means for positioning in front of the upper chest of the occupant, thus providing a safety device which would be a comfortable all the time and a safety-table in trouble time.

22. In combination with means as set forth, in claim 1, wherein the forwardly portion of the supporting and positioning structure comprise means of operatively slidable and pivotable attachment for a rigid, substantially rectangular knee-guard shield means normally supported in flat, horizontally transverse position above and forward of the seat occupant's knees, and operatively, adjustably connected by adjustable means to the forward edge of said protective element in such manner whereby said protective element, whenever it starts tilting past a predetermined degree of tilt also starts, through said connecting means attached to its forward edge, to tilt downwardly the forward edge of said knee-guard shield, thus positioning its flat transverse panel into progressively more vertical angle in front of occupant's knees.

23. In combination with means as set forth in claim 22, wherein said knee-guard means is configured of rigid material in form of a flat transverse panel with its outboard edges curved sufficiently to resist lateral sliding of occupant's knees from it during a lateral collision of said vehicle and including padding where beneficial; spring means holding it in flat, transversely horizontal position above and forward of occupant's knees, and pivotally attached on its rear edge to slidable means adjustably operatively attachable to rigid, longitudinally disposed members of said supporting structure, and at its front transverse center comprising means for slidably adjustable operative engagement with the longitudinally disposed connecting means between front center of said knee-guard means and the front center edge of said protective element for their mutually cooperative tilting about their respective axis when said protective element is pivoted past the predetermined degree of its tilt.

24. In combination with means as set forth in claim 22, wherein said knee-guard panel is configured to be slidably adjustable and securable over its supporting structure in its longitudinally spaced-apart relationship to said protective element, so that the two will be able to accommodate various physical configurations of a seated occupant as related to the length of his thighs, and adjustable means to determine at what point of said protective element's tilting angularity said knee-guard element will start to tilt downwardly against said occupant's knees, thus causing the two elements to balance the inertia load to his upper torso through said protective element against the load of his lower torso through said knee-guard means in any degree of proportional relationship as desired by said seat occupant.

25. In combination with means as set forth in claim 1, wherein said supporting structure for adjustable support and positioning of said protective element is operably powered by means of hydraulic pressure, comprising especially modified hydraulic cylinder means positioned longitudinally and pivotally attached to the vehicle structure at its cylinder end including means to adjust and lock it in any preselected degree of pivot; the outward end of its piston rod modified for pivotal connection with said protective element for automatically positioning it to its minimum proximity to said seat, remote control means actuating the hydraulic pressure in said cylinders whenever said seat is occupied and said vehicle reaches preselected speed; additional remote control means to extend it to closer proximity to said seat if desired, means to keep it in any desired position and means to automatically remove it from such proximity to said seat after said vehicle is stopped.

26. In combination with means as set forth in claim 25, wherein the hydraulic system used for adjustable support and positioning of said protective element comprise hydraulic cylinders of the double-acting, single-stage type.

27. In combination with means as set forth in claim 25, wherein the hydraulic system used for adjustable support and positioning of said protective element comprise a specially modified single-acting, single-stage hydraulic cylinder means to serve as a hydraulic shock-absorber means, whereby said protective element is automatically extended by the hydraulic pressure controlled by the seat-occupancy and vehicle speed-sensor means to its minimum preselected proximity to the seat, after which said element is adjustable by hand operated remote control means to suit the seat occupant's desires, including means to hold it in said position, and from then on the system using the shock-absorbing capacity of said cylinders to absorb the impact of its occupant's torso against said tiltable protective element in time of severe deceleration of said vehicle, and remotely operated release for said hydraulic pressure when said vehicle is stopped.

28. In combination with means as set forth in claim 1, wherein said protective element is automatically possitionable in proximity to said seat by a supporting structure employing hydraulic means for its operation, with its hydraulic pressure being used as a shock-absorbing means for restraining of said seat occupant's torso during any sudden deceleration of said vehicle, and controllable by a specially configured seat-occupancy sensor means which is able to differentiate between various weights of said seat occupants.

29. In combination with means as set forth in claim 25, comprising "fail-safe" emergency means configured to allow the seat occupant to be able to position and adjust said protective element into and out of the desired proximity to him by hand operated means at any time said hydraulically operative means should fail to function, by slowly pushing and pulling said protective element in and out as desired, the hydraulic liquid in the system functioning as a shock-absorbing means during any severe pressure against said protective element by seat occupant's torso during a collision of said vehicle.

30. In combination with means as set forth in claim 1, wherein said supporting and positioning structure comprise a plurality of rigid arms pivotally secured to the rigid vehicle structure on their forward ends and tiltably attached to said protective element on their rearward ends, automatically actuated operative means attached to the forwardly ends of said arms so configured that said arms will position said protective element in the desired proximity to said vehicle seat by pivoting downwardly about their transverse pivotal axis of attachment to said vehicle structure whenever said seat is occupied and said vehicle reaches preselected speed, and will automatically remove it from such proximity only when said vehicle is traveling below said preselected speed and a remote control is activated by said occupant of said seat.

31. In combination with means as set forth in claim 1, wherein said supporting and positioning structure comprise a plurality of rigid arms secured on their forward ends to two gear-sector means operable by a series of reduction gears powered by a reversible electric motor, the system enclosed in a housing means secured to the rigid structure of said vehicle in such location that when said gear-sector means is turned, it will tilt said arms and position said protective element in and out of proximity to said seat.

32. In combination with means as set forth in claim 1, adapted for vehicles with seats spaced one behind another and a rigid sides surrounding said seats, a supporting structure for automatically positioning said protective element in and out of proximity to the seat comprising a plurality of longitudinally positioned rigid arms attached on their front ends to a modified gear-sector means operatively connected with a gear-reduction means powered by a reversible electric motor, the complete assembly configured into a housing securely attached to said rigid sides of said vehicle, the other ends of said rigid arms pivotally attached to said protective element for tiltable connection around its transverse tilting axis.

33. In combination with means as described in claim 32 wherein said gear-sector assemblies are secured to the rigid side structure at substantially the height of the seat back cushion, said positioning arms are slidably attached to said gear-sector means, including limiting stop means for the range of such proximity, said assembly so configured whereby said protective element is normally stored against the roof panel of said vehicle, but when said seat is occupied and the vehicle reaches predetermined speed, said positioning arms will tilt downwardly and position said protective element into adjustable proximity to said seat over the lap of the seated occupant.

34. Means as set forth in claim 1, wherein said supporting and positioning structure comprise a plurality of preferably curved rigid arms pivotally secured to the rigid vehicle structure on their lower ends, their upper ends extending into the interior of said protective element of define the axis of its tilting movement and a plurality of auxiliary bracing-bar means slidably and pivotally attached at one end to said rigid arms and on the other end attached to a special housing secured to a rigid structure of said vehicle and comprising gear-sector means operable by a reduction gear means powered by a reversible electric motor means remotely controlled by sensor means activated by the occupancy of the seat and predetermined speed of the vehicle into positioning said protective element into and out of proximity to said seat, and automatically removing it from such proximity only when said vehicle is moving slower than said predetermined speed of said vehicle.

35. In combination with means as set forth in claim 34, adapted for use with a rear seat of a vehicle wherein three preferably curved rigid arms are pivotably connected to said protective element and assisted by three auxiliary bracing means, with only the middle one operable by said gear-sector means while the two outboard bracing means are pivotally secured to two mounting plates secured to the side structure of said vehicle.

36. In combination with means as set forth in claim 34, adapted for rear seat of a vehicle wherein three preferably curved rigid arms are pivotally connected to the protective element and assisted by three auxiliary bracing means, a transverse bar rigidly connecting said auxiliary bracing means at their pivotal axis of attachment to said vehicle structure so they all pivot in unison, a gear reduction means powered by a reversible electric motor and operably engaged with said bar to turn it left and right thereby causing said auxiliary bars to pivotally slide over said supporting arms and extend said protective element in and out of proximity to said seat.

37. In combination with means as set forth in claim 1, wherein said supporting and positioning structure comprise a plurality of rigid arms pivotally secured at one end to rigid reinforcing channel means of the protective element to define its tiltable axis, their other ends secured to a gear-sector means positioned forwardly of said seat and operable by a reduction gear means powered by a reversible electric motor controlled by the seat-weight and the vehicle speed-sensor means of said vehicle, a plurality of auxiliary bracing means pivotally attached to said positioning arms at one end and comprising a modified electrically releasable pawl-means coacting within an elongated ratchet means housing attached to the rigid vehicle structure substantially above said gear-sector housing means, said supporting structure so configured whereby it will automatically position and releasably lock said protective element in proximity of said seat, adjust it there as desired by the seat occupant, and automatically remove it from such proximity when said sensor means allow it.

38. In combination with means as set forth in claim 1, wherein said supporting and positioning structure comprise a plurality of rigid arms pivotally secured to the protective element at its transverse pivotal axis, their forward ends pivotally attached to a rigid vehicle structure and comprising auxiliary bracing and actuating means pivotally attached to said rigid arms on lower ends and pivotally secured to a specially configured housing which comprise a gear-reduction means powered by a reversible electric motor and operatively connected to a double-rack-and-pinion means which is secured substantially above said pivotal attachment of said rigid arms, including electrically releasable pawl means so configured that when said seat is occupied and said vehicle reaches preselected speed, said gear-housing will automatically move downwardly in said rack-and-pinion means and position said protective element into desired proximity of said seat and remove it therefrom when said vehicle is stopped and a separate control is actuated.

39. In combination with means as set forth in claim 1, wherein said supporting and positioning structure comprise a plurality of rigid arms with their front ends configured for slidably releasable operative engagement within vertically disposed housing means secured to the rigid side structure of said vehicle, an assembly comprising a gear-sector means driven by a reduction gear means powered by a reversible electric motor means secured substantially vertically above said vertically disposed housing; a plurality of auxiliary bracing-bar means pivotally secured to said rigid arms on lower end and to said gear-sector on upper end, the whole positioning structure so configured whereby said protective element will be automatically positionable into and out of its proximity to said seat in accordance with the occupancy of said seat and the speed of said vehicle, by said sector means pivoting said auxiliary bracing means back and forth, thus forcing the front ends of said positioning arms to slide up and down and forcing said protective element back and forth into and out of its proximity to said seat.

40. In combination with means as set forth in claim 1, wherein said supporting and positioning structure comprise a plurality of preferably curved rigid supporting arms pivotably, adjustably secured to the rigid vehicle structure on their forward ends, their rearward ends entering into said protective elements for pivotal connection to it at its transverse tiltable axis, a hydraulic cylinder means of the double-acting single-stage type pivotally attached to the rigid structure of the vehicle with the outward ends of the piston rods pivotally attached to said supporting arms, the structure so configured that when said seat is occupied and the vehicle reaches preselected speed, the hydraulic pressure will be allowed to extend said piston rods and thus position said protective element into proximity to said seat as desired by the seat occupant, but will not allow said element's removal unless said vehicle is stopped.

41. In combination with means as set forth in claim 1, configured for installation in vehicles with seats one behind another and comprising a rigid side structure surrounding said seats, a supporting and positioning structure comprising a pair of rectangular plates secured to said side structure in front of said seat, the plates adapted for pivotal attachment of rigid supporting and positioning arms which have their opposite ends configured for entering said protective element and pivotally attached thereto, and double-acting, single-stage hydraulic cylinders secured to said plates, with the outward ends of their piston rods pivotally secured to shorter bracing bar means pivotally attached to said positioning arms, the whole assembly so configured that when said seat is occupied and said vehicle reaches preselected speed, said protective element will be automatically positioned into preselected degree of proximity to said seat and will not be removable therefrom unless said vehicle is moving at less than said preselected speed.

42. In combination with means as set forth in claim 1, modified for use with seats wide enough to accomodate a plurality of occupants, wherein said protective element comprise at its bottom surface a plurality of divider means folded normally into the bottom surface but positionable angularily to said bottom surface to form retaining means when desired, thus dividing said bottom surface into plurality of sections to prevent seat occupants from sliding towards the direction of any lateral impact against said vehicle, and means at the rearwardly edge of said protective element to accomodate replaceable and repositionable bib and chin-guard means to accomodate the needs of said seat occupants.

43. In combination with means as set forth in claim 1, wherein the shape of said protective element is defined by a sufficiently rigid frame defining the desired limits of its protective contact with said seat occupant's torso, including specially configured bracing means projecting downwardly from said wider surface position adapted for easy connection to and limited tilting movement about a transverse axis of attachment, the space between the two outermost of said bracing means configured of a preshaped panel of, flexible and pressure yielding material in such manner whereby said element will provide sufficient restraining capability for the seat occupant's torso in time of any collision of said vehicle without causing any undue abrasions and contusions to his body by said safety device while it is restraining him in said seat.

44. In combination with means as set forth in claim 1, wherein said supporting and positioning structure comprise a plurality of rigid primary supporting and positioning means and a plurality of rigid auxiliary means operatively interconnected to them and to the rigid structure of said vehicle, and so configured whereby the means of power operated, automatically actuated means of positioning said protective element into and out of its proximity to said seat are operatively attached to the primary supporting and positioning means of said safety device.

45. In combination with means as set forth in claim 1, wherein said supporting and positioning structure comprise a plurality of rigid primary supporting and positioning arms and a plurality of rigid auxiliary means operatively interconnected to them and to the rigid structure of said vehicle, the assembly so configured whereby the auxiliary means are power operated and automatically actuated to position said protective element, pivotally, tiltably attached to the primary supporting arms, into and out of its proximity to said seat.

46. In combination with means as set forth in claim 1, adapted for protection of occupants of a multi-seat vehicles, comprising protective elements normally retracted but automatically positionable in proximity to the seats by individually powered means serving each seat but centrally controlled by the operator of the vehicle who can actuate the automatic positioning of said protective elements all at one time, comprising means whereby the seat occupants may manipulate the relative position of said protective elements between their normally retracted and optionally extended positions when the centrally actuated control means permit and when said vehicle is not moving.

47. In combination with means as set forth in claim 11, wherein said resiliently compressible means insertable into said channel means are easily interchangeable and of varied degrees of resistance to pressure, thus being easily replaced not only after any type of a severe damage to them after a collision of said vehicle but also to offer a choice of various degrees of resistance to the tilting of said protective element according to the anticipated weight of the seat occupant.

* * * * *

UNITED STATES PATENT OFFICE
CERTIFICATE OF CORRECTION

Patent No. 3,893,703  Dated July 8, 1975

Inventor(s) John J. Chika

It is certified that error appears in the above-identified patent and that said Letters Patent are hereby corrected as shown below:

In the Abstract, line 24, cancel "thus or"; line 27, "this" should read -- thus --; line 28, "of" should read -- or --. Column 2, line 3, "safety-table" should read -- Safety-Table --; line 22, "its" should read -- it --; line 28, "safety-table" should read -- Safety-Table --; line 44, after "vehicle" insert -- even --. Column 4, line 9, "safety-table" should read -- Safety-Table --; line 40, "desired" should read -- desires --; line 35, "safety-table" should read -- Safety-Table --. Column 5, line 1, "if" should read -- is --. Column 7, line 1, "35f" should read -- 36f --; line 30, after "could" insert -- either --. Column 9, line 8, "opertively" should read -- operatively --; line 58, "47a" should read -- 47q --; line 64, "indicatingi" should read -- indicating --. Column 10, line 19, "femu" should read -- femur --; line 27, "roog" should read -- roof --. Column 11, line 51, "chain" should read -- chin --. Column 12, line 2, "of" should read -- or --; line 12, "eadh"

UNITED STATES PATENT OFFICE
CERTIFICATE OF CORRECTION

Patent No. __3,893,703__  Dated __July 8, 1975__

Inventor(s) __John J. Chika__  Page - 2

It is certified that error appears in the above-identified patent and that said Letters Patent are hereby corrected as shown below:

should read -- each --; line 62, "melans" should read -- means --. Column 13, line 37, "whtn" should read -- when --; line 52, "kneel" should read -- knee --; line 65, after "right" insert -- there --. Column 14, line 18, "relaced" should read -- replaced -- replaced --; line 33, "hard" should read -- hand --; line 45, "rotates" should read -- create --; line 47, "conversion" should read -- convenience --; line 52, "vesion" should read -- version --; line 59, after "model" insert -- to model --; line 60, "his" should read -- this --; line 65, "thereof", second occurrence, should read -- therefore --. Claim 1, line 8, after "surface", first occurrence, insert -- portion; line 17, before "away" insert -- position --; line 34, "other" should read -- and --. Claim 2, line 47, "expandable" should read -- extendable --. Claim 3, line 57, "mechanisma" should read -- mechanisms --; line 63, "association" should read -- associated --. Claim 9, line 4,

UNITED STATES PATENT OFFICE
CERTIFICATE OF CORRECTION

Patent No. 3,893,703　　　　　　　Dated　July 8, 1975

Inventor(s)　　John J. Chika　　　　　　　Page - 3

It is certified that error appears in the above-identified patent and that said Letters Patent are hereby corrected as shown below:

"reward" should read -- rearward --. Claim 21, line 30, "comfortable" should read -- comfort-table --. Claim 22, line 33, after "forth" remove -- , --. Claim 24, line 12, "to" should read -- of --.

Signed and Sealed this

*thirtieth* Day of *December 1975*

[SEAL]

*Attest:*

RUTH C. MASON　　　　　　　　　　C. MARSHALL DANN
*Attesting Officer*　　　　　　　　*Commissioner of Patents and Trademarks*